United States Patent
Davidov (10) Patent No.: US 6,598,752 B1
(45) Date of Patent: Jul. 29, 2003

(54) DISK HOLDER DEVICE AND METHOD

(76) Inventor: Tsachi Davidov, 16 Tamar Street, Neve Monoson 60190 (IL)

( * ) Notice: Subject to any disclaimer, the term of this patent is extended or adjusted under 35 U.S.C. 154(b) by 0 days.

(21) Appl. No.: 09/822,501

(22) Filed: Apr. 2, 2001

(30) Foreign Application Priority Data

Mar. 18, 1999 (IL) .................................................. 129040

(51) Int. Cl.$^7$ ................................. A47F 5/00; A47F 7/00
(52) U.S. Cl. ...................... 211/40; 211/96; 211/DIG. 1; 248/206.5; 312/9.58
(58) Field of Search .............................. 211/40, 41.12, 211/96, 168, 169, DIG. 1; 312/9.58, 9.9; 248/206.5, 205.3

(56) References Cited

U.S. PATENT DOCUMENTS

| | | | | |
|---|---|---|---|---|
| 3,017,999 A | * | 1/1962 | Cano ............................. 211/40 |
| 4,426,007 A | * | 1/1984 | Beleckis et al. ............... 211/40 |
| 4,781,292 A | * | 11/1988 | Sacherman et al. ....... 211/40 X |
| 5,495,953 A | * | 3/1996 | Bearth ......................... 211/40 |
| 5,806,694 A | * | 9/1998 | Selmer-Pedersen .......... 211/40 |
| 5,964,356 A | * | 10/1999 | Gareau et al. ................. 211/40 |
| 5,984,441 A | * | 11/1999 | Stokhuijzen .............. 211/96 X |
| 6,073,764 A | * | 6/2000 | Haas et al. ........... 211/41.12 X |
| 6,279,761 B1 | * | 8/2001 | Niewadomski et al. ... 211/96 X |
| 6,286,692 B1 | * | 9/2001 | Hemping .................... 211/169 |

* cited by examiner

Primary Examiner—Robert W. Gibson, Jr.
(74) Attorney, Agent, or Firm—Dekel Patent Ltd.; David Klein (57) ABSTRACT

A disk holder comprising means for attaching to a disk storage device and means for holding to a support surface, wherein there is a rotary joint between the storage device and the support surface. A method for holding disks comprising the following steps: A, forming a holding means for attaching to a support surface; B, attaching the holding means to a storage device through a rotary joint.

4 Claims, 14 Drawing Sheets

DISK HOLDER DEVICE AND METHOD

TECHNICAL FIELD

This invention concerns storage devices. The invention relates in particular to a disk storage device with a holder and a rotary joint and a method therefor.

BACKGROUND ART

Heretofore, various means were used to store disks, for example music compact disks (CD), DVDs or computer compact disks.

At present, CDs are stored on shelves, in storage boxes, or in stacked individual packages. Individual packages may be hinged, for example on a vertical pole.

Each of these prior art devices has its disadvantages. Large storage boxes make it difficult to locate a desired disk. Shelves take more space. Hinged packages require special support means, especially adapted for attaching these packages.

All the above result in a static structure that is difficult to change, to adapt to a desired place.

When one considers the fact that a user may have many disks, it becomes apparent that the disk storage issue is a real problem.

Moreover, a user may desire to open the package to take out the disk, while the package remains in place. This allows to play the disk without disturbing the order of the CD pack. This may be difficult or impossible with existing disk storage methods. For example, disks placed on shelves have to be taken out in order to open the package for an individual disk.

Another problem with existing CD storage devices is that a lateral force is applied, this results in a large mechanical moment on the holding area. The large moment tends to dislocate the CD storage device from its support.

It would be desirable to hold the storage device off its narrow side, for ease of use and to allow the storage of a large quantity of devices. This, however, poses the problem of the large lateral moments as detailed above.

Furthermore, a disk storage device has fragile corners, that breaks down on impact and are easily damaged.

It is an objective of the present invention to provide for a disk holder, with means for overcoming the above detailed deficiencies.

DISCLOSURE OF INVENTION

It is an object of the present invention to provide a disk holding device that has a rotary joint and is attachable to a support surface. This object is achieved by a disk holder as disclosed in claim 1.

According to one aspect of the present invention, magnetic holding means are attached to a disk storage device.

The disk storage device can then be easily attached to any ferromagnetic surface. It is also easy to remove the storage device from its support, simply by taking it down.

Thus, a disk storage device may be stored anywhere, without any shelves or storage boxes.

In another embodiment, other holding means may be used in lieu of the magnetic means, for example a piece of Scotch, Velcro, snap fits, vacuum holder or other mechanical holding means.

A rotary joint or hinge in the holding device allows it to rotate freely, to prevent mechanical moments that may tear down the device from its support.

The hinge also allows to examine or open the CD storage device without removing it from its support.

Moreover, a user may open the package to take out the disk, while the package remains in place. This allows to play the disk without disturbing the order of the CD pack.

A plurality of disks can thus be attached anywhere, immediately, as desired by the user.

Each disk may be taken down with similar ease.

The holding device engulfs two of the fragile corners of the disk storage device, to protect them from breaking down. Thus a more reliable storage device is achieved.

A method for holding disks comprises the steps of forming magnetic holding means and attaching these means to a storage device through a rotary joint.

Further objects, advantages and other features of the present invention will become obvious to those skilled in the art upon reading the disclosure set forth hereinafter.

MODES FOR CARRYING OUT THE INVENTION

A preferred embodiment of the present invention will now be described by way of example and with reference to the accompanying drawings.

Figure 1:
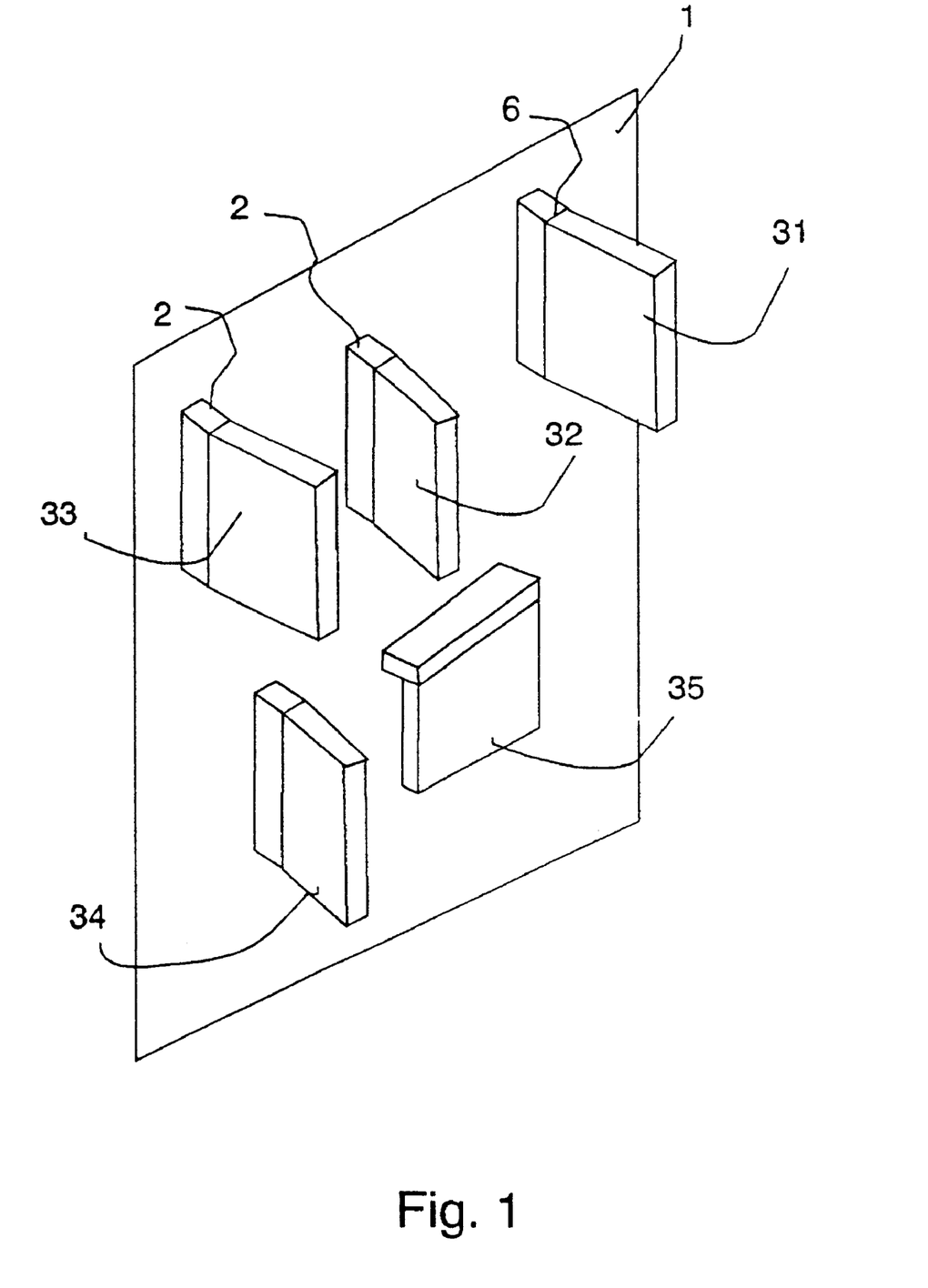
FIG. 1 illustrates a plurality of disk holders being attached to a ferromagnetic support.

Referring to FIG. 1, a preferred embodiment of the present invention, a plurality of compact disks CDs with magnetic disk holders 2 can be attached to a ferromagnetic support 1 as detailed in FIG. 1. Each of the disk holders 2 is attached to one of the disk storage devices 31, 32, 33, 34, 35, etc.

Throughout the present disclosure, it is to be understood that the invention may be applied to various storage devices, for example storage devices for compact disks (CDs), DVD, audio cassettes, video cassettes or similar devices.

A rotary joint 6 is formed between each disk holder 2 and a corresponding disk storage device. The rotary joint prevents a large mechanical moment that may be otherwise generated on the contact area between the holder 2 and the support 1, for example when a lateral force is applied on the disk holder. The rotary joint prevents this moment by allowing an angle to be formed between the two parts. By preventing moments on the surface of contact with support 1, better adherence to that support is achieved.

Thus, a plurality of disk holders 2 can be attached to a ferromagnetic support 1 at various angles, as illustrated. Despite the various random angle of each holder 2, each is securely attached to the support 1.

Throughout the present disclosure, it is to be understood that the invention may use other holding means rather than the magnetic means as illustrated. For example, the holding means may include a piece of Scotch, Velcro, snap fits, vacuum holder or other mechanical holding means.

Figure 2:
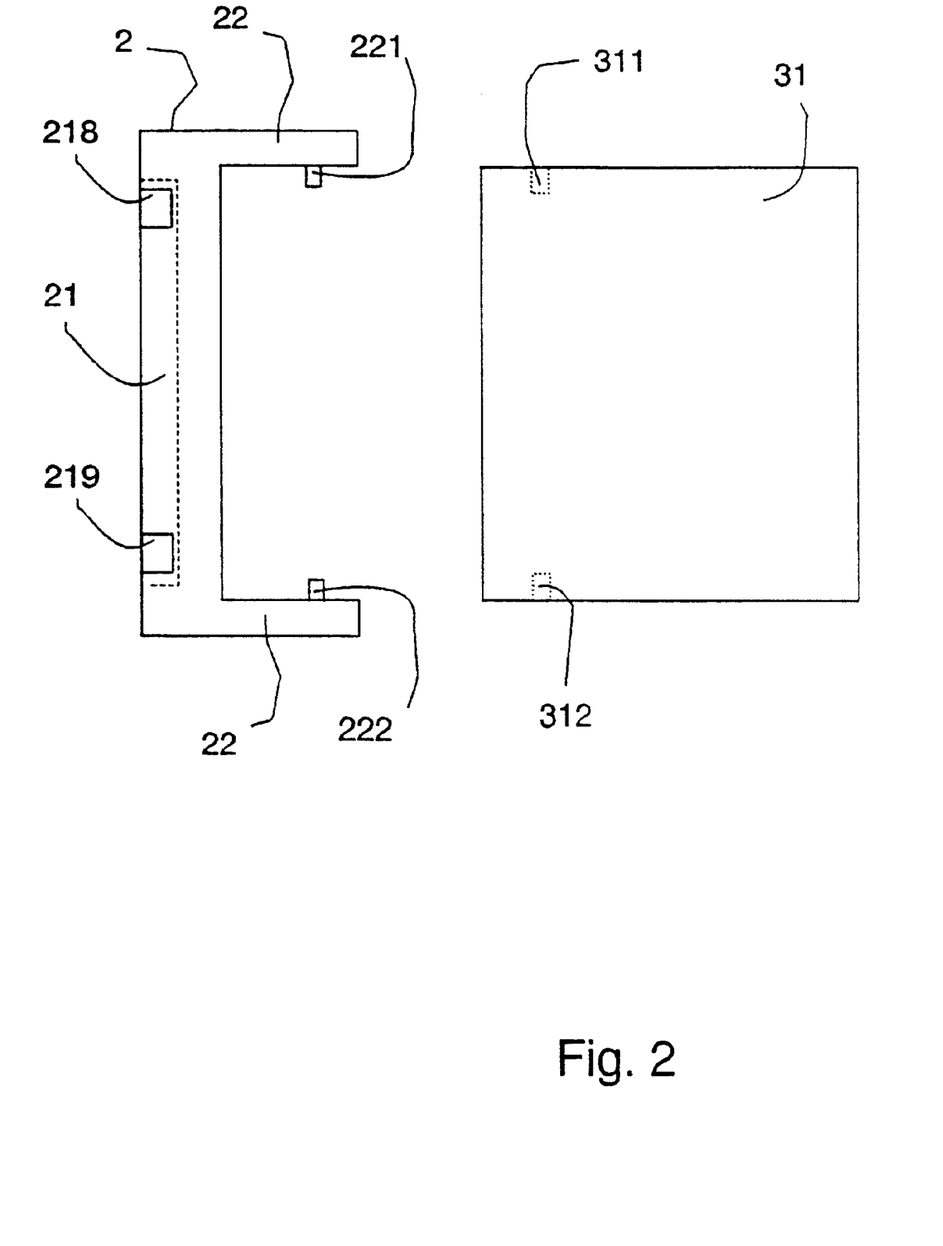
FIG. 2 illustrates the structure of a one-piece disk holder.

FIG. 2 illustrates the structure of a one-piece disk holder 2, that is attached to a disk storage device 31 with a rotary joint. A disk storage device 31 has holes 311, 312 therein as illustrated. Holes 311 and 312 may be made in an ordinary storage device, to allow the disk holder to attach thereto while forming a rotary joint between disk storage device and disk holder.

The disk holder 2 has disk holding arms 22 with disk holding protrusions 221, 222 that are so shaped and spaced as to be snap-inserted into the holes 311, 312. Thus a rotary joint is formed, that keeps the storage device 31 secure to the holder 2, while allowing its rotation. Various other means for forming a rotary joint may be used, for example by adding protrusions to the disk storage device.

The distance between arms 22 is made about equal to the width of a disk storage device 31 and the device is made of an elastic material.

This allows for easy attachment of the disk holder 2 to a storage device 31, simply by forcing the arms 22 apart, inserting the device 31 therebetween and allowing the arms 22 to return to their normal state, with protrusions 221 and 222 kept in the corresponding holes 312 and 312.

In one embodiment, the disk holder 2 also includes a magnetic holding strip 21 that will attach to a ferromagnetic support.

In another embodiment, the disk holder 2 includes two pieces of magnet, one piece 218 close to its upper edge and the other piece 219 to its lower edge.

Various other embodiments are possible, with a plurality of magnetic pieces or a magnetic powder being used.

In one embodiment, the part 21 attached to the cassette is a fixed magnet, it attaching to a soft ferromagnetic base.

In another embodiment, the base includes a plurality of fixed magnets as well, all oriented so as to enhance the magnetic force therebetween. In yet another embodiment, the holding surface has fixed magnets, and the disk holder 2 has a soft ferromagnetic material.

Electromagnets may also be used, although this may require the use of electrical energy for the operation of the device.

Furthermore, the disk holder 2 protects the fragile corners of the disk storage device 31: usually a disk holder is made of polystyrene, that breaks down on impact and is easily damaged. With the arms 22 engulfing two corners of the disk storage device 31, these corners are protected from damage.

In a preferred embodiment, the disk holder 2 is made of ABS or a similar plastic material with good elastic properties. The disk holder 2 will thus achieve good adherence to a disk storage device 31.

Thus, a hinged magnetic CD (disk) holder is achieved.

Figure 3:
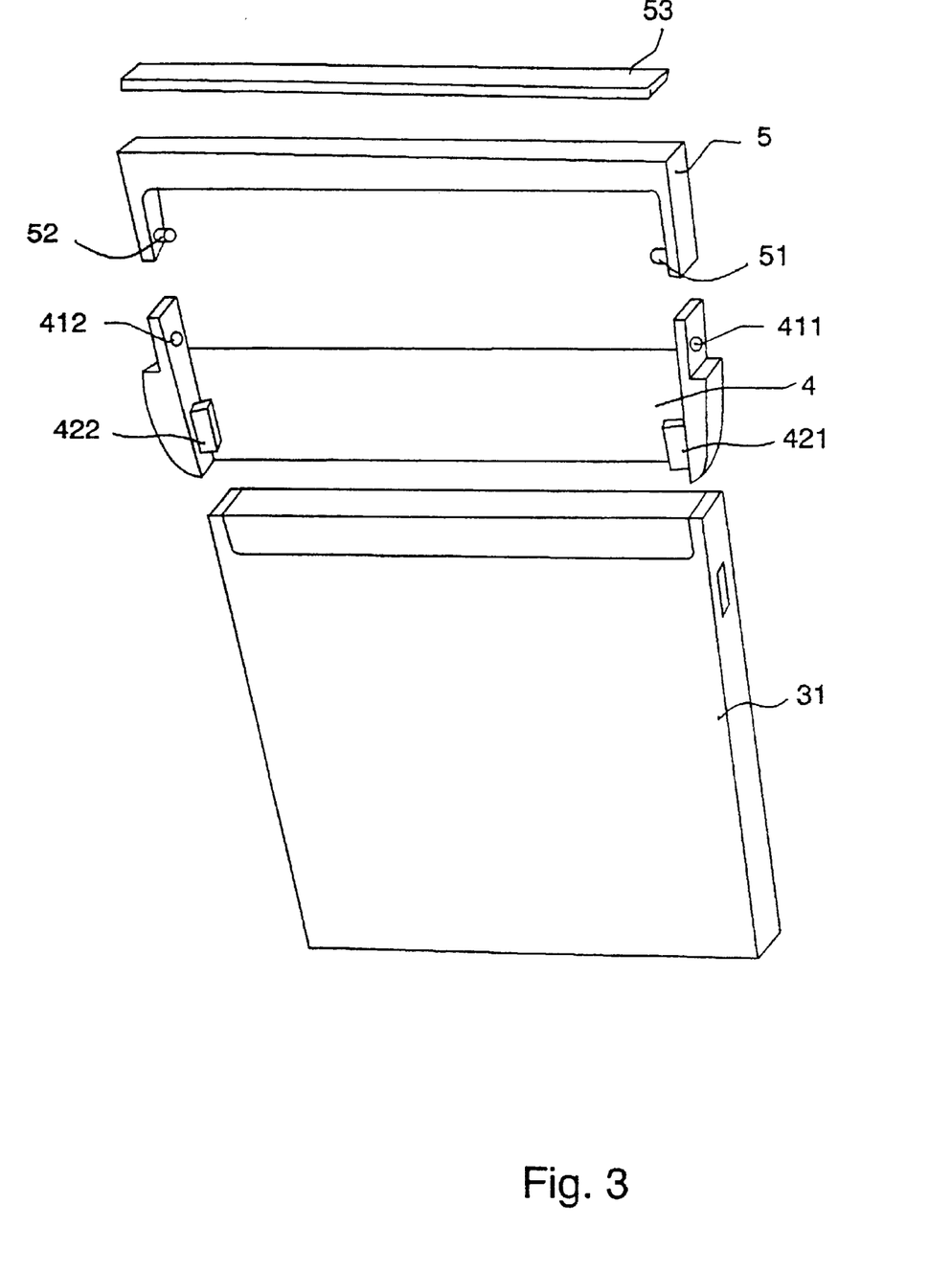
FIG. 3 illustrates the structure of a two-piece disk holder.

FIG. 3 illustrates the structure of a two-piece disk holder. The device comprises a disk holding part 4 that attaches to disk storage device 31, and an attaching part 5 that adheres to ferromagnetic supports. Part 5 has a magnetic holding strip 53 that may be used to attach to any ferromagnetic part like a surface, mesh, beam etc. Part 5 also has protrusions 51, 52 to attach to the other part 4 to form a rotary joint, to allow the rotation of part 4 with respect to part 5.

The advantages of the rotary joint were discussed elsewhere in the present disclosure.

The disk holding part 4 has two holes 411, 412 to engage protrusions 51, 52 in part 5 so as to form a rotary joint.

Part 4 also includes two protrusions 421, 422 that attach to corresponding holes in disk storage device 31.

Figure 4:
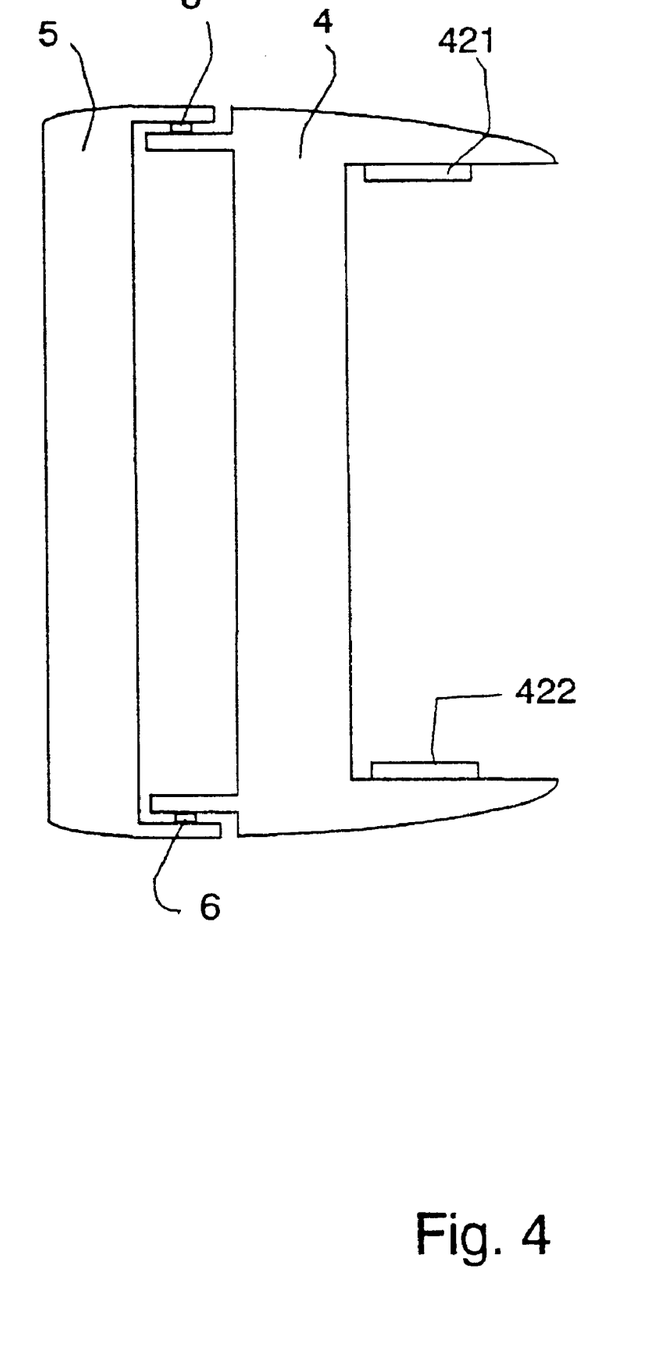
FIG. 4 illustrates a side view of one embodiment of a two-piece disk holder.

FIG. 4 illustrates a side view of one embodiment of a two-piece disk holder. The disk holding part 4 attaches to the disk storage device (not shown) using protrusions 421, 422. In this embodiment, protrusions 421 and 422 are elongated, to engage corresponding slots in the disk storage device. The attaching part 5 has protrusions to attach to the other part 4, to form the rotary joint 6 as illustrated.

Figure 5A:
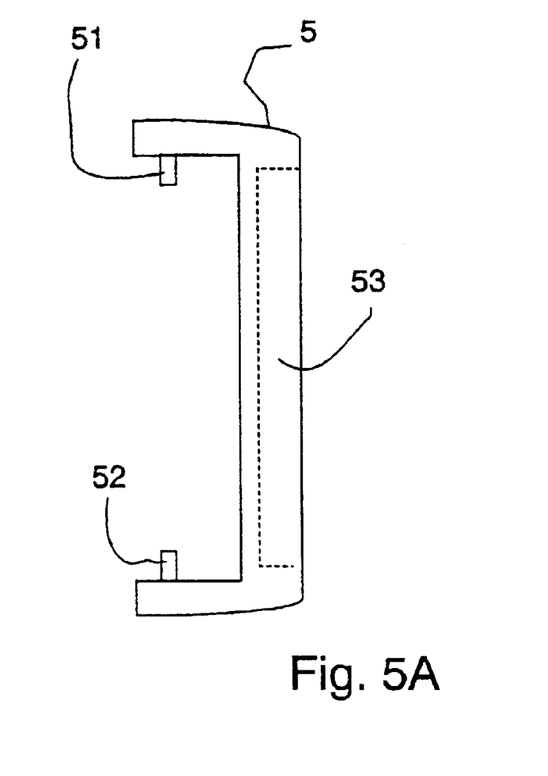
FIGS. 5A, 5B and 5C detail the structure of the part that attaches to the ferromagnetic support, with FIGS. 5A, 5B and 5C detailing a front view, a side view and a top view respectively.
Figure 5B:
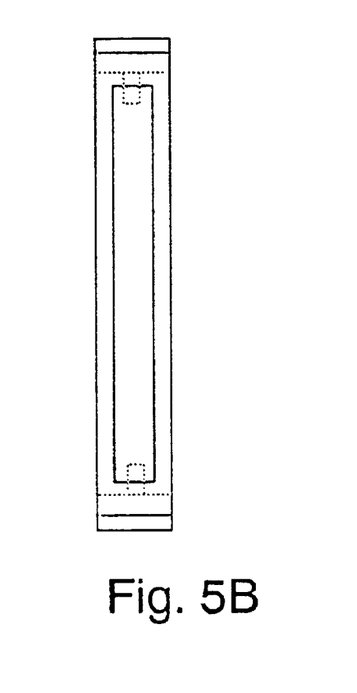
Figure 5C:
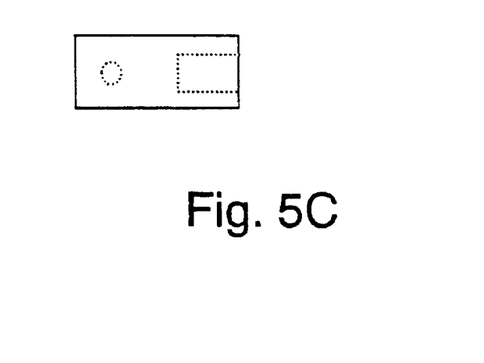

FIGS. 5A, 5B and 5C detail the structure of the part 5 that attaches to the ferromagnetic support, with FIGS. 5A, 5B and 5C detailing a front view, a side view and a top view respectively.

The attaching part 5 has protrusions 51, 52 to attach to the other part (not shown) of the disk holder, and magnetic holding strip 53 to attach to a ferromagnetic part.

Figure 6A:
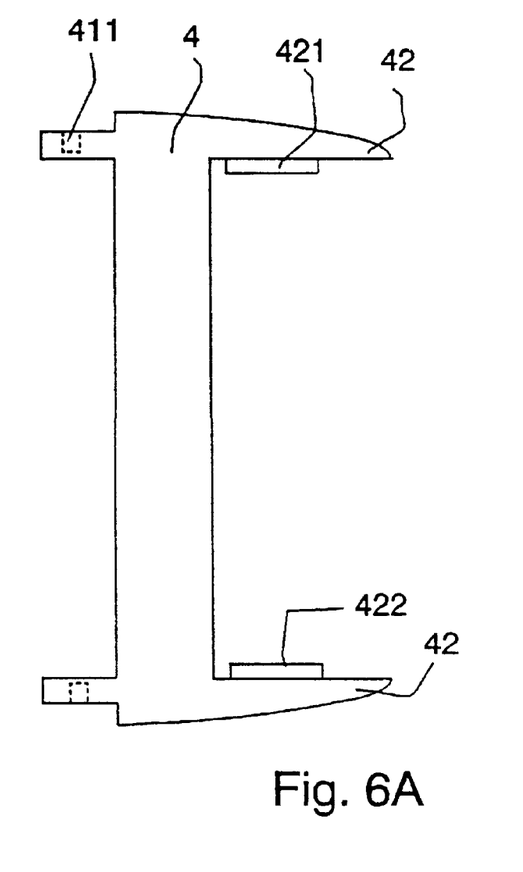
FIGS. 6A, 6B and 6C detail the structure of the part that attaches to the CD case, with FIGS. 6A, 6B and 6C detailing a front view, a side view and a top view respectively.
Figure 6B:
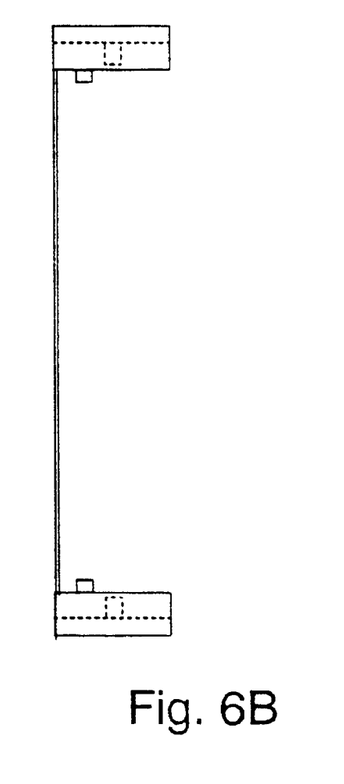
Figure 6C:
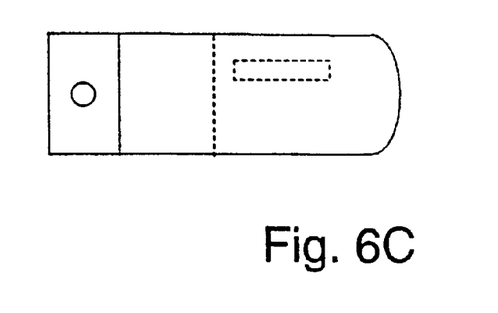

FIGS. 6A, 6B and 6C detail the structure of the part 4 that attaches to the CD case, with FIGS. 6A, 6B and 6C detailing a front view, a side view and a top view respectively. The part has disk holding arms 42 with disk holding protrusions 421, 422, that are adapted to corresponding slots in the CD case. If a CD case has other type of holes or slots, then according to the present invention the holder is adapted to that shape to hold the CD case.

A structural part 43 holds the parts of the device together. The disk holding part 4 has two holes 411, 412 to engage corresponding protrusions in part 5.

Figure 7:
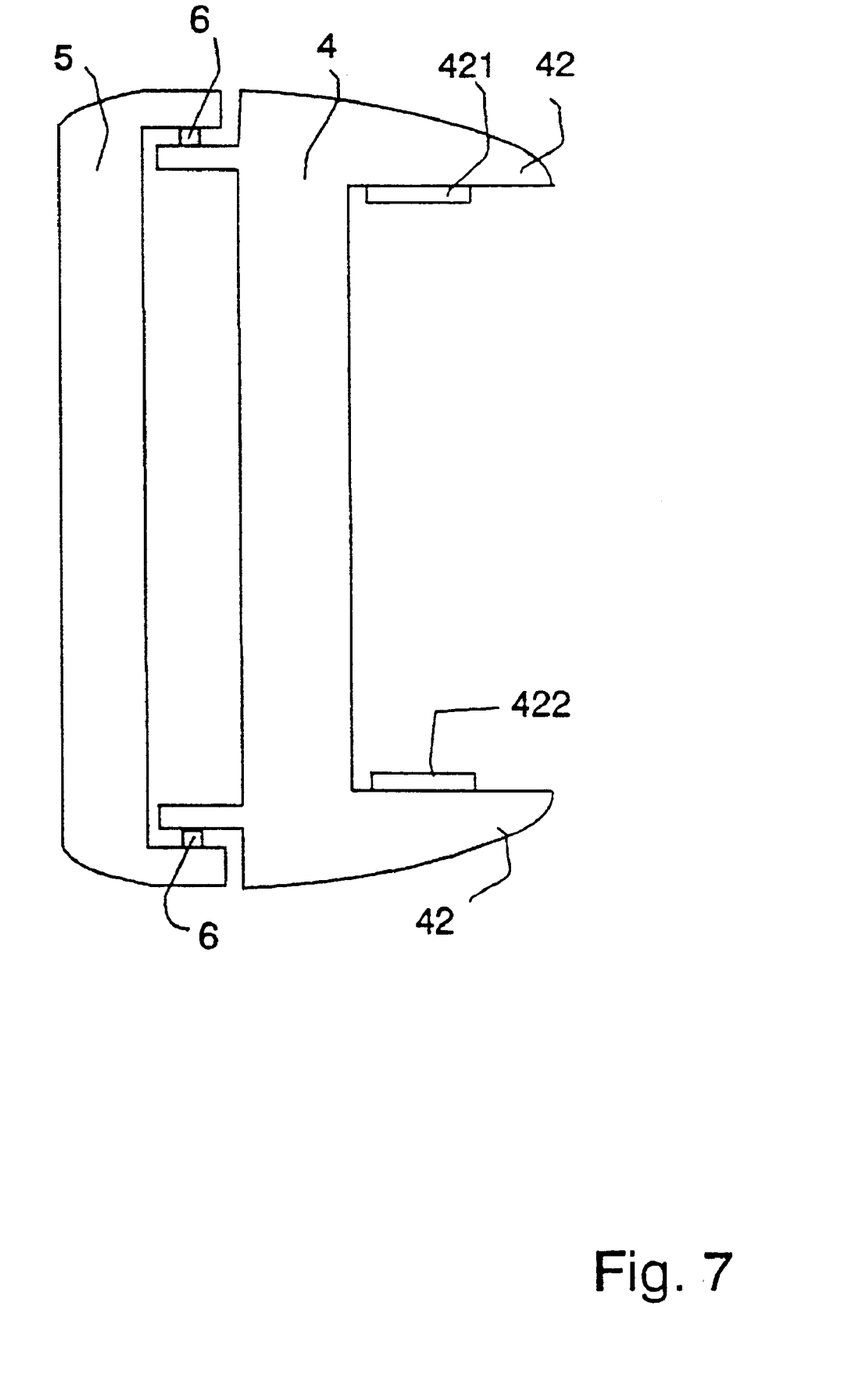
FIG. 7 illustrates a side view of another embodiment of a two-piece disk holder.

FIG. 7 illustrates a side view of another embodiment of a two-piece disk holder.

The disk holding part 4 attaches to a disk storage device (not shown) using protrusions 421, 422 therein.

The attaching part 5 has protrusions to attach to the other part 4, to form the rotary joint 6.

In the embodiment as illustrated, the disk holding arms 22 are differently shaped than that in the previously illustrated embodiment, with a more full and curved structure.

Figure 8:
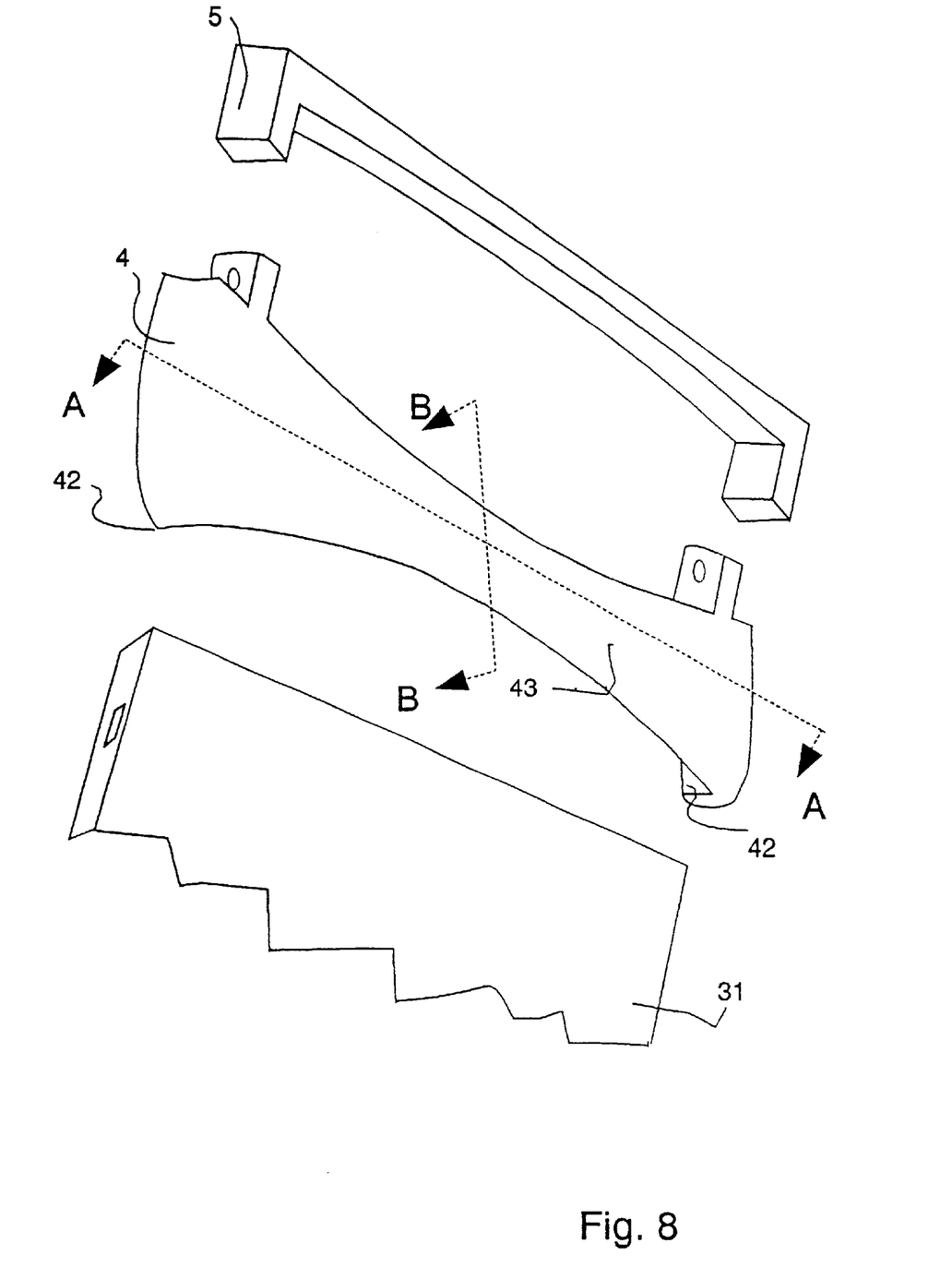
FIG. 8 illustrates yet another embodiment of a two-piece disk holder.

FIG. 8 illustrates yet another embodiment of a two-piece disk holder. A disk holding part 4 attaches to a disk storage device 31 using protrusions (not shown) therein.

The attaching part 5 has protrusions to attach to the other part 4, to form a rotary joint therebetween.

The disk holding arms 42 and the structural part 43 have a curved structure as shown.

This curved shape achieves better mechanical strength and a good, elastic grip on the disk storage device 31.

Figure 9:
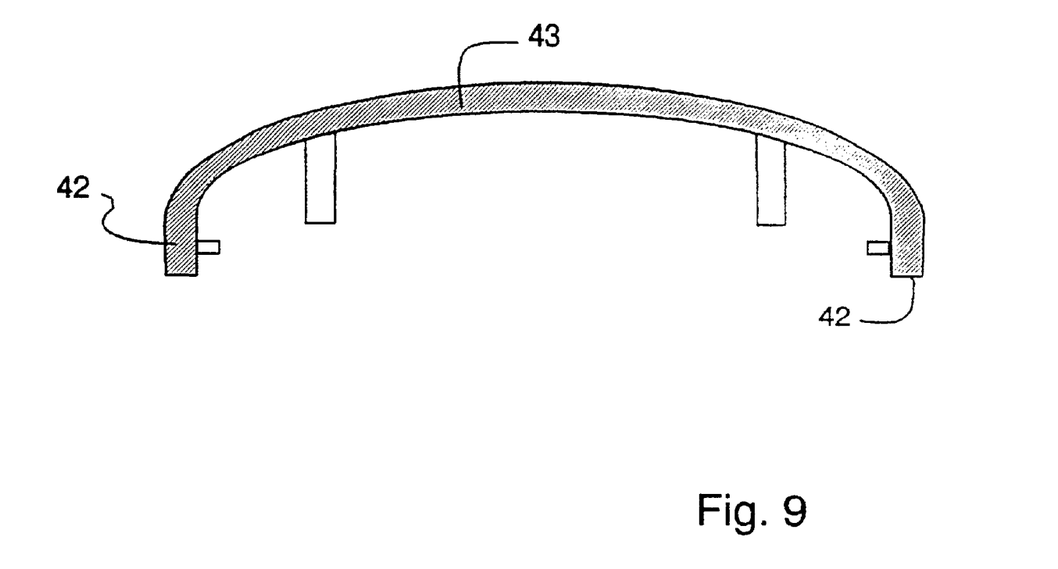
FIG. 9 details a cross-sectional view along lines AA in FIG. 8.

FIG. 9 details a cross-sectional view along lines AA in FIG. 8. The disk holding arms 42 and the structural part 43 have a curved structure.

Figure 10:
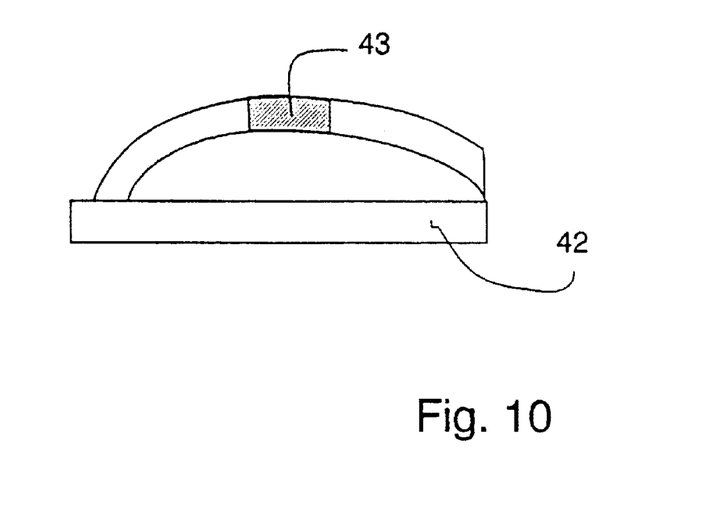
FIG. 10 details a cross-sectional view along lines BB in FIG. 8.

FIG. 10 details a cross-sectional view along lines BB in FIG. 8. The disk holding arms 42 and the structural part 43 have a curved structure as illustrated.

Figure 11:
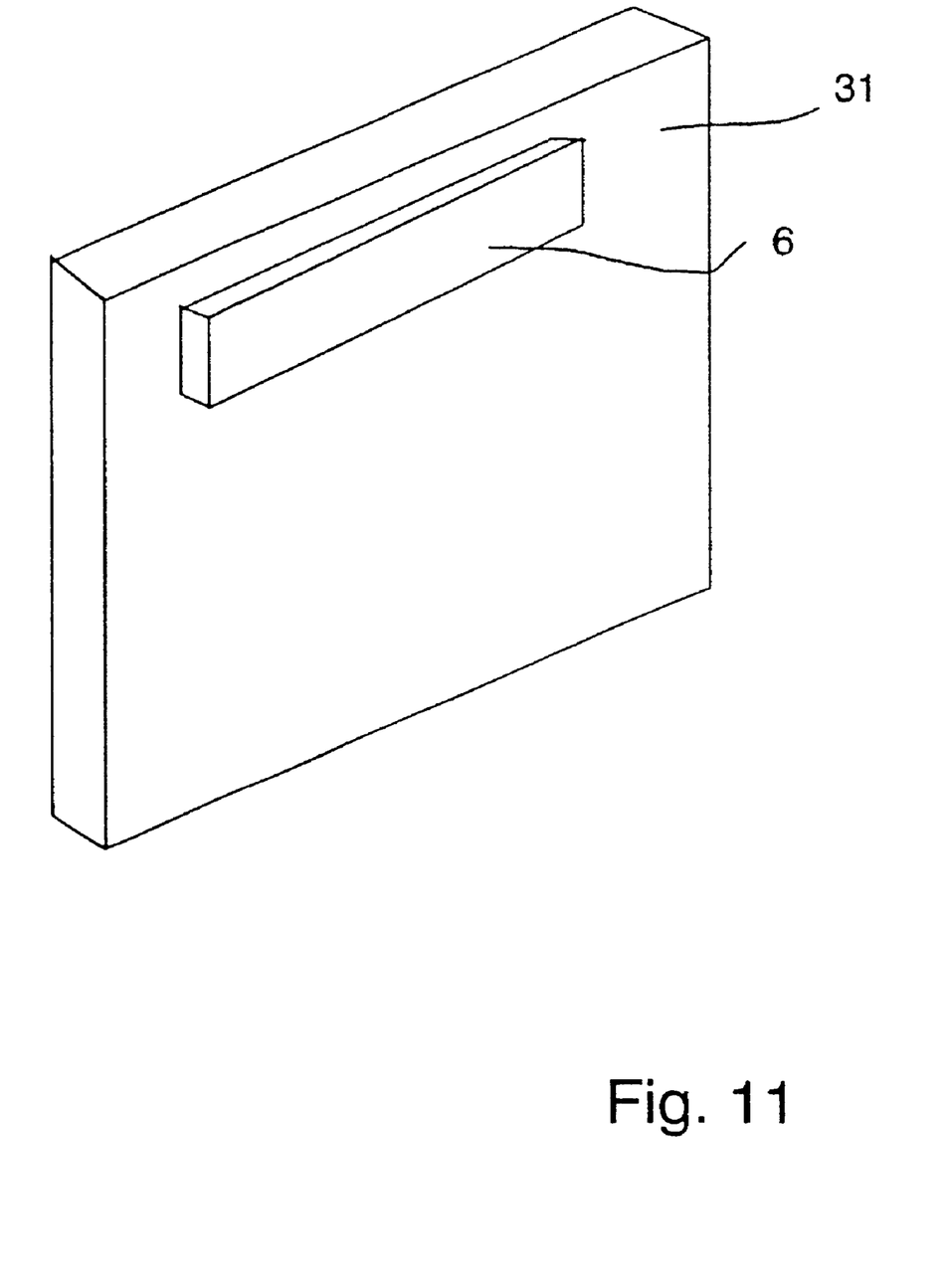
FIG. 11 illustrates a simple magnetic stripe attached to a disk storage device.

FIG. 11 illustrates a simple magnetic stripe 6 being attached to a disk storage device 31. This structure also may be attached at random to a ferromagnetic surface (not shown).

The stripe 6 may be attached to device 31 using any of various methods, for example: device 31 may be manufactured (plastic injection) with stripe 6 in the molding form, or stripe 6 may have an adhesive backing (not shown) for sticking to a device 31.

Magnetic strips may be mounted on various parts of a disk storage device, including any of the lateral sides or the front or back. One or more strips may be used.

The magnetic strips thus attached may then be used to secure the disk storage device to any ferromagnetic surface or to a magnet.

Figure 12:
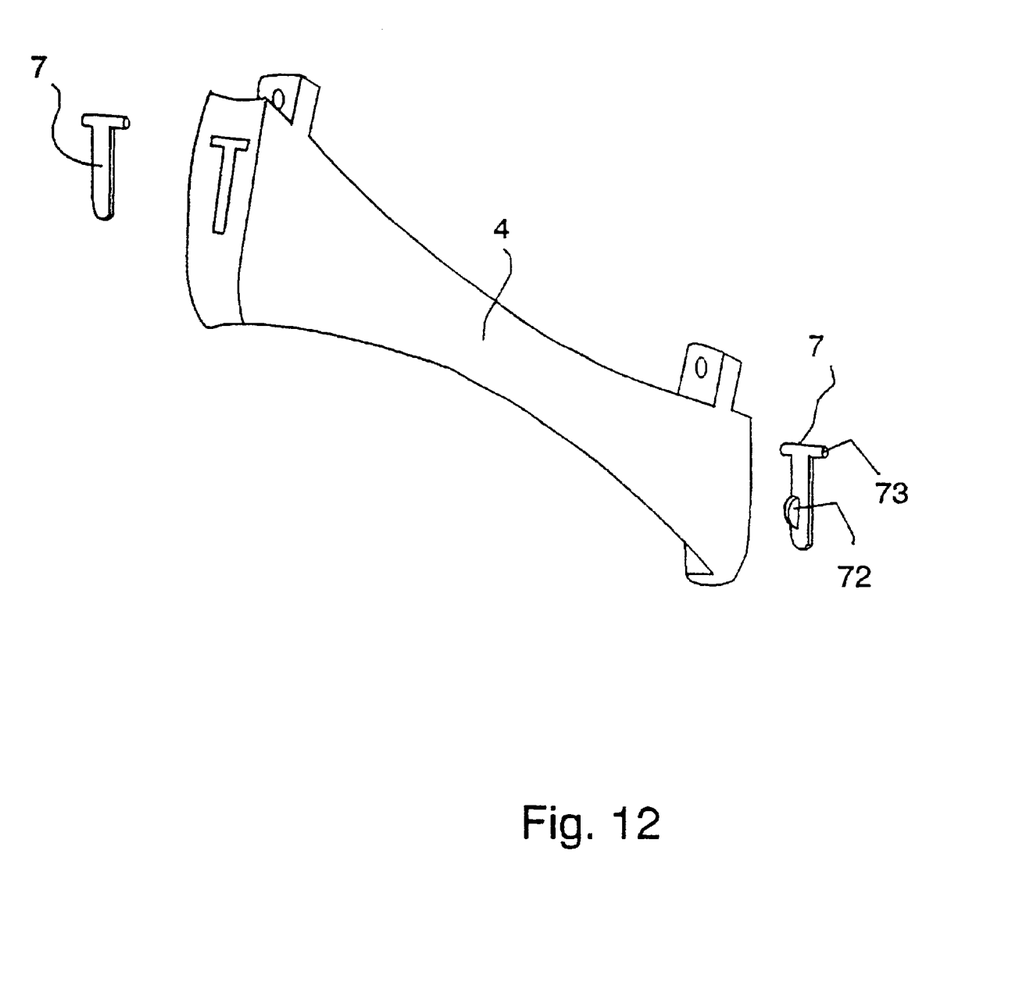
FIG. 12 illustrates a disk holding device with latch means.

FIG. 12 illustrates a disk holding part 4 having latch means 7 on each side as shown. This embodiment may achieve a better holding of the disk storage device where the slot in the storage device is close to one side, so that the inherent elasticity of part 4 is not enough to allow the insertion of the holding means in that slot.

To achieve a reliable attachment to the disk storage device, together with ease of operation of the device, device 4 in this embodiment has a pair of rotating latch means 7. Latches 7 are mounted in part 4 so that they can rotate about axis 73. To attach to a disk storage device, the latches 7 are first drawn out to bring the storage device in contact with holding part 4. The latches 7 are then pushed in, toward the disk holding device, so that a protrusions 72 in each latch 7 enters a corresponding slot in the disk storage device, to hold it in place.

Figure 13:
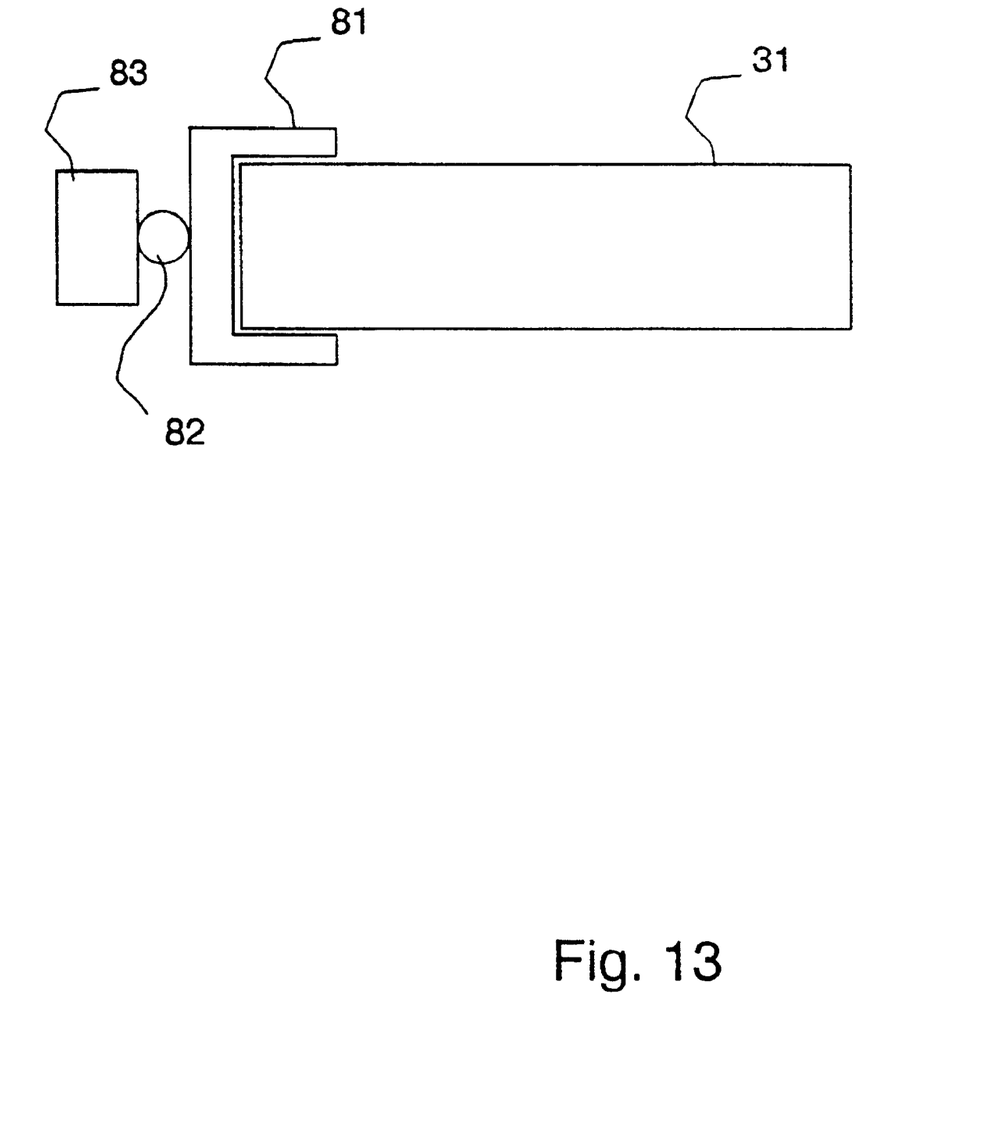
FIG. 13 details another embodiment of a disk holding device.

FIG. 13 details another embodiment of a disk holding device used with a disk storage device 31. The holding device includes clamping means 81, in this example a U-shaped device, connected to rotary joint means 82. The rotary joint is devised to prevent a lateral moment during storage.

The device further includes the holding means 83, to attach to a wall or another holding surface.

Holding means 83 may be implemented in various ways, for example using magnetic means and/or a piece of Scotch and/or Velcro, snap fits, vacuum holder or other mechanical holding means.

Figure 14:
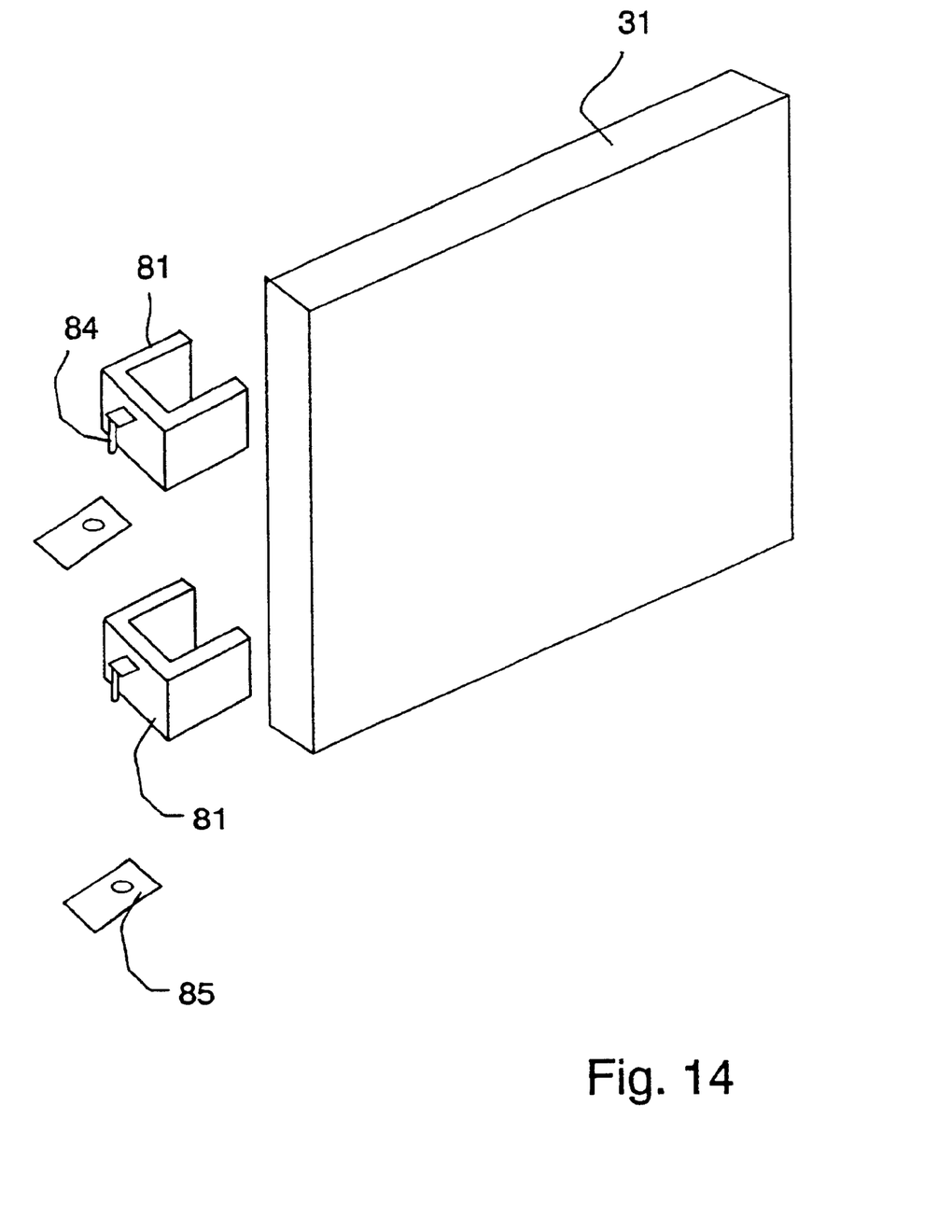
FIG. 14 details yet another embodiment of a disk holding device.

FIG. 14 details yet another embodiment of a disk holding device, to be used with a disk storage device 31.

The device includes one or more clamping means 81, in this example a pair of U-shaped devices.

Some or all of the clamping means 81 may further include a protuberance 84, which forms a rotary joint with the disk holding device when inserted in holes in that device.

In yet another embodiment, the holding surface has protruding pieces 85 with holes therein, and protuberances 84 are inserted in these holes.

A mechanical support means is thus achieved, without magnets or other holding means. Because of the nature of protuberance 84 and its corresponding hole, a rotary joint is achieved as well, to prevent lateral moments on the device.

Figure 15:
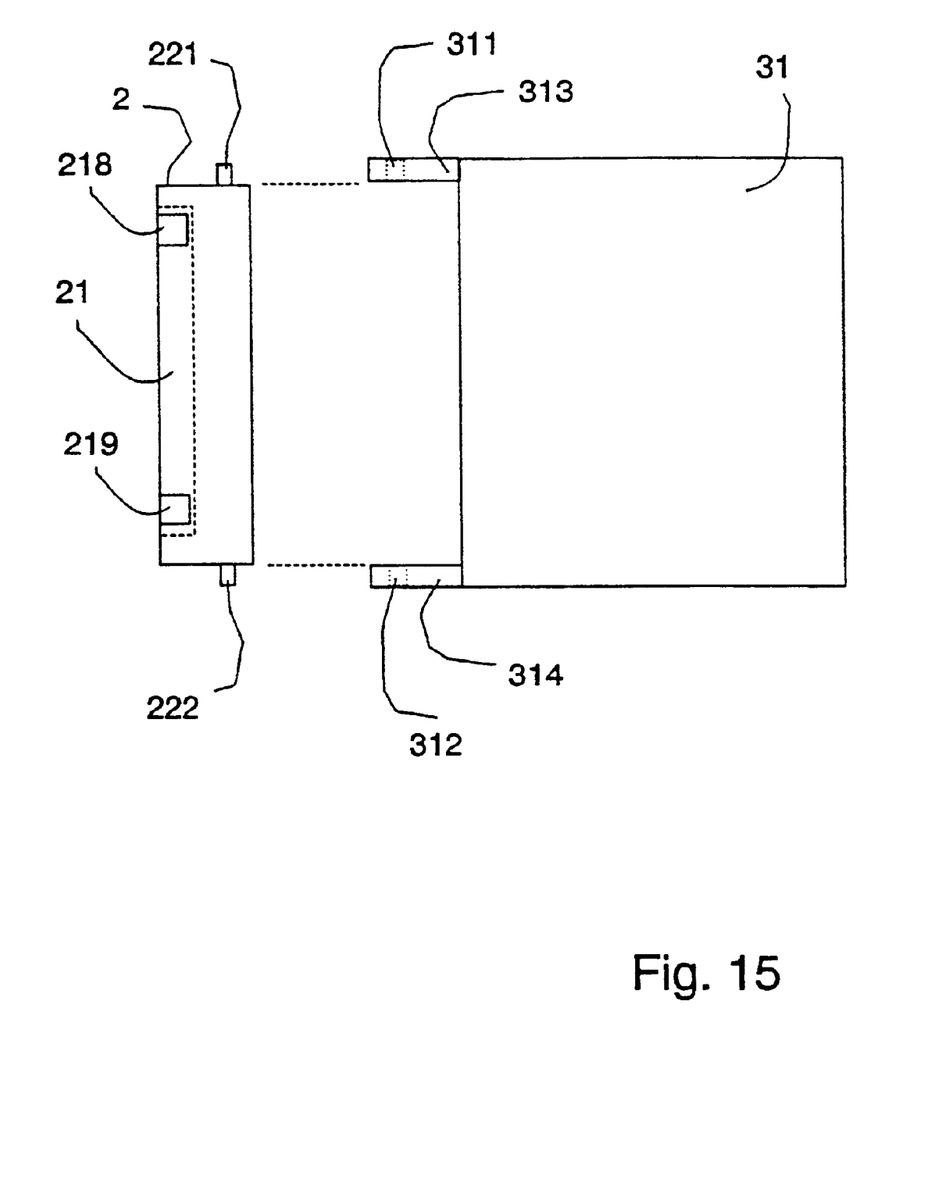
FIG. 15 details another embodiment of a disk holding device.

FIG. 15 details another embodiment of a one-piece disk holder 2, that is attached to a disk storage device 31 through a rotary joint. The rotary joint is formed with a simple structure, wherein the disk storage device 31 has two elongated portions 313 and 314 built in, with corresponding holes 311 and 312 therein, as illustrated.

The disk holder 2 has two disk holding protrusions 221 and 222, that are so shaped and spaced as to be snap-inserted into the holes 311, 312. Thus a rotary joint is formed, that keeps the storage device 31 secure to the holder 2, while allowing its rotation.

The length of part 2 is made about equal to the width of a disk storage device 31. Preferably, the device is made of an elastic material. This allows for easy attachment of the disk holder 2 to a storage device 31, simply by forcing the parts 313 and 314 apart, inserting the device 2 therebetween and allowing the parts 313 and 314 to return to their normal state, with protrusions 221 and 222 kept in the corresponding holes 312 and 312.

In one embodiment, the disk holder 2 also includes a magnetic holding strip 21 that will attach to a ferromagnetic support.

In another embodiment, the disk holder 2 includes two pieces of magnet, one piece 218 close to its upper edge and the other piece 219 to its lower edge.

Various other embodiments are possible, with a plurality of magnetic pieces or a magnetic powder being used.

Other attaching means may be used in lieu of the magnets in part 2, as detailed elsewhere in the present disclosure.

Thus, a hinged attachable CD (disk) holder is achieved.

The invention also relates to improved methods for holding disks. The following two methods are examples of possible embodiments of the invention.

Method 1 for Holding Disks

A method for holding disks comprises the following steps:

A. forming a holding means for attaching to a support surface; and The holding means may include magnetic means and/or a piece of Scotch, Velcro, snap fits, vacuum holder or other mechanical holding means.

B. attaching the holding means to a storage device through a rotary joint. End of method.

Method 2 for Holding Disks

Another method for holding disks comprises the following steps:

A. forming one or more holes in a storage device for disks or other devices.

The holes, with a pieces protruding thereinto from a holding device, form a rotary joint to prevent the formation of lateral moments.

B. attaching holding means to the storage device. The holding means has one or more protuberances that enter the holes in the storage device, to form a rotary joint.

C. attaching the holding means to the holding device, to allow attaching the whole device to a wall or a holding plate.

The holding means may include magnetic means and/or a piece of Scotch and/or Velcro, snap fits, vacuum holder or other mechanical holding means. End of method.

Various embodiments of the above device and method may be implemented. It will be recognized that the foregoing is but one example of an apparatus and method within the scope of the present invention and that various modifications will occur to those skilled in the art upon reading the disclosure set forth hereinbefore.

What is claimed is:

1. A disk holder comprising means for attaching to a disk storage device and means for holding to a support surface, wherein the attaching means further includes means for forming a rotary joint between the storage device and the support surface, wherein said means for holding comprises at least one fixed magnet, and the support surface includes means for achieving ferromagnetic properties.

2. A disk holder comprising means for attaching to a disk storage device and means for holding to a support surface, wherein the attaching means further includes means for forming a rotary joint between the storage device and the support surface, wherein said means for attaching to a disk storage device comprises two arms with protrusions receivable in corresponding apertures in said disk storage device.

3. The disk holder according to claim 1, wherein said means for holding comprises at least one of a VELCRO fastener, a snap fit fastener, and a vacuum holder.

4. The disk holder according to claim 2, wherein said means for holding comprises at least one of a VELCRO fastener, a snap fit fastener, and a vacuum holder.

\* \* \* \* \*